United States Patent
Kim et al.

(10) Patent No.: US 11,089,628 B2
(45) Date of Patent: Aug. 10, 2021

(54) HETEROGENEOUS NETWORK ALLOCATION VECTOR (NAV)-BASED COMMUNICATION IN WIRELESS LAN SYSTEM

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 16/095,673

(22) PCT Filed: Apr. 20, 2017

(86) PCT No.: PCT/KR2017/004220
§ 371 (c)(1),
(2) Date: Oct. 22, 2018

(87) PCT Pub. No.: WO2017/183917
PCT Pub. Date: Oct. 26, 2017

(65) Prior Publication Data
US 2020/0359418 A1 Nov. 12, 2020

Related U.S. Application Data

(60) Provisional application No. 62/326,026, filed on Apr. 22, 2016, provisional application No. 62/342,202, (Continued)

(51) Int. Cl.
*H04W 74/08* (2009.01)
*H04L 1/18* (2006.01)
(Continued)

(52) U.S. Cl.
CPC ....... *H04W 74/0816* (2013.01); *H04L 1/1812* (2013.01); *H04W 72/0446* (2013.01); *H04W 84/12* (2013.01)

(58) Field of Classification Search
CPC . H04W 72/02; H04W 72/0446; H04W 84/12; H04W 74/0816; H04W 48/16;
(Continued)

(56) References Cited

U.S. PATENT DOCUMENTS 10,009,841 B2 * 6/2018 Huang .............. H04W 52/0209
10,321,485 B1 * 6/2019 Noh .................. H04W 74/0816
(Continued)

FOREIGN PATENT DOCUMENTS

KR 1020080087139 9/2008
KR 1020140113599 9/2014

OTHER PUBLICATIONS

PCT International Application No. PCT/KR2017/004220, Written Opinion of the International Searching Authority dated Jul. 25, 2017, 16 pages.
(Continued)

*Primary Examiner* — Hanh N Nguyen
(74) *Attorney, Agent, or Firm* — Lee, Hong, Degerman, Kang & Waimey PC

(57) ABSTRACT

In the wireless LAN system, the station STA receives a frame and updates a corresponding Inter-BSS Network Allocation Vector (NAV) or Intra-BSS NAV according to whether the frame is an Inter-BSS (Basic Service Set) frame or an Intra-BSS frame. If the received frame cannot be distinguished from the Inter-BSS frame or the Intra-BSS frame, it updates the Inter-NAV, and after receiving the frame that cannot be distinguished from the Inter-BSS frame or the Intra-BSS frame, it receives the CF-End frame, and then the corresponding NAV is reset.

10 Claims, 10 Drawing Sheets

Related U.S. Application Data filed on May 27, 2016, provisional application No. 62/347,117, filed on Jun. 8, 2016, provisional application No. 62/362,597, filed on Jul. 15, 2016, provisional application No. 62/364,901, filed on Jul. 21, 2016.

(51) Int. Cl.
*H04W 72/04* (2009.01)
*H04W 84/12* (2009.01)

(58) Field of Classification Search
CPC ... H04W 8/26; H04W 12/06; H04W 72/0406; H04L 5/0055; H04L 1/00003; H04L 1/1812
See application file for complete search history.

(56) References Cited

U.S. PATENT DOCUMENTS

| | | |
|---|---|---|
| 10,492,224 B2 * | 11/2019 | Kim ................. H04L 1/0031 |
| 2003/0123405 A1 | 7/2003 | del Prado et al. |
| 2010/0165963 A1 | 7/2010 | Chu et al. |
| 2017/0257344 A1 * | 9/2017 | Huang ............. H04L 61/6022 |
| 2017/0311352 A1 * | 10/2017 | Lv ................... H04W 74/0816 |

OTHER PUBLICATIONS

Gupta, N. et al., "A Performance Analysis of the 802.11 Wireless LAN Medium Access Control", Communications in Information and Systems, vol. 3, No. 4, pp. 279-304, Sep. 2004, 26 pages.

* cited by examiner

HETEROGENEOUS NETWORK ALLOCATION VECTOR (NAV)-BASED COMMUNICATION IN WIRELESS LAN SYSTEM

CROSS-REFERENCE TO RELATED APPLICATIONS

This application is the National Stage filing under 35 U.S.C. 371 of International Application No. PCT/KR2017/004220, filed on Apr. 20, 2017, which claims the benefit of U.S. Provisional Application No. 62/326,026, filed on Apr. 22, 2016, 62/342,202, filed on May 27, 2016, 62/347,117, filed on Jun. 8, 2016, 62/362,597, filed on Jul. 15, 2016, and 62/364,901, filed on Jul. 21, 2016, the contents of which are all hereby incorporated by reference herein in their entireties.

TECHNICAL FIELD

The present invention relates to a wireless local area network (WLAN) system. More specifically, the present invention relates to a method and apparatus for solving the problem of operating a separate NAV (Network Allocation Vector) for an internal or external of BSS in a WLAN system.

BACKGROUND ART

Although a hybrid NAV communication scheme described below can be applied to various wireless communications, a WLAN system as an example of applicable system to which the present invention is described.

Standards for WLAN (Wireless Local Area Network) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbit/s for 8 spatial streams and IEEE 802.11ax standards are under discussion.

IEEE 802.11ax system is referred to as a HE (High Efficiency) system.

DETAILED DESCRIPTION OF THE INVENTION

Technical Problems

It is discussed that the HE system operates on a hybrid NAV including inter-BSS NAV and Intra-BSS NAV. However, among the frames used in the HE system, there is the frame that is indistinguishable between the inter-BSS frame and the Intra-BSS frame. Therefore, the available resources may not be used, or a collision may occur due to an erroneous TXOP truncation.

It is an object of the present invention to provide a method and apparatus for efficiently preventing confusion in a system using a hybrid NAV as described above.

The present invention is not limited to the technical problems described hereinabove, and other technical problems can be derived from embodiments of the present invention.

Technical Solutions

The object of the present invention can be achieved by providing a method for transmitting a signal by a first station (STA) in a Wireless Local Area Network (WLAN) system, the method comprising: receiving a first frame, wherein an Inter-Basic Service Set (BSS) Network Allocation Vector (NAV) or an Intra-BSS NAV is updated based on whether the first frame is an Inter-BSS frame or an Intra-BSS frame, and wherein the Inter-BSS NAV is updated when the first frame is indistinguishable between the Inter-BSS frame and the Intra-BSS frame; and receiving a Contention-Free End (CF-END) frame, wherein the Inter-BSS NAV or the Intra-BSS NAV is reset in response to receiving the CF-END frame for other cases other than a first case that the CF-END frame is the Inter-BSS frame and a latest NAV update is by receiving the first frame determined as the Intra-BSS frame, and a second case that the CF-END frame is the Intra-BSS frame and the latest NAV update is by receiving the first frame determined as the Inter-BSS frame; and transmitting the signal based on the Inter-BSS NAV or the Intra-BSS NAV that have been reset.

In another aspect of the present invention, provided herein is a first station (STA) operating in a WLAN (wireless LAN) system, the first STA comprising: a transceiver configured to receive a first frame and a CF-End frame; and a processor for updating an Inter-BSS Network Allocation Vector (NAV) or an Intra-BSS NAV based on whether the first frame is an Inter-BSS (Basic Service Set) frame or an Intra-BSS frame, wherein the processor is configured to update the inter-BSS NAV when the first frame is indistinguishable between the Inter-BSS frame and the Intra-BSS frame; and when the transceiver receives the CF-END frame, the Inter-BSS NAV or the Intra-BSS NAV is configured to reset based on the reception of the CF-END frame, for other cases other than a first case that the CF-END frame is the Inter-BSS frame and a latest NAV update is by the first frame determined as the Intra-BSS frame and a second case that the CF-END frame is an Intra-BSS frame and the latest NAV update is by the first frame determined as the Inter-BSS frame.

Preferably, the method further comprise: resetting the related Inter-BSS NAV or Intra-BSS NAV in response to receiving the CF-END frame based on whether the latest NAV update is by receiving the first frame is indistinguishable between the Inter-BSS frame and the Intra-BSS frame.

Preferably, the method further comprise: resetting the inter-BSS NAV or the intra-BSS NAV based on whether the CF-END frame is the Inter-BSS frame or the Intra-BSS frame.

Preferably, the method further comprise: resetting the inter-BSS NAV regardless of whether the CF-END frame is an Inter-BSS frame or an Intra-BSS frame.

Preferably, the method further comprise: setting the Inter-BSS NAV timer or the Intra-BSS NAV timer to zero at the end of the CF-END frame, when the Inter-BSS NAV or the Intra-BSS NAV is reset.

Preferably, wherein the first frame which is indistinguishable between the Inter-BSS frame and the Intra-BSS frame, is an ACK frame or a Clear-To-Send (CTS) frame.

Preferably, the method further comprise: transmitting a signal in accordance with the Inter-BSS NAV or the Intra-BSS NAV that has been reset, further comprising receiving a trigger frame from an access point (AP) of an Intra-BSS and transmitting an uplink data based on the trigger frame.

Preferably, wherein the processor is further configured to reset the Inter-BSS NAV or the Intra-BSS NAV based on the reception of the CF-END frame, when the latest NAV update is by the first frame that is indistinguishable between the Inter-BSS frame and the Intra-BSS frame.

Preferably, wherein the processor is further configured to reset the Inter-BSS NAV or the Intra-BSS NAV based on whether the CF-END frame is the Inter-BSS frame or the Intra-BSS frame.

Preferably, wherein the processor is further configured to reset the Inter-BSS NAV regardless of whether the CF-END frame is the Inter-BSS frame or the Intra-BSS frame.

Preferably, wherein the processor is further configured to set an Inter-BSS NAV timer or an Intra-BSS NAV timer to zero at the end of the CF-END frame, if the Inter-BSS NAV or the Intra-BSS NAV is reset.

Preferably, wherein the first frame that is indistinguishable between the Inter-BSS frame and the Intra-BSS frame, is an ACK frame or a Clear-To-Send (CTS) frame.

Preferably, wherein the processor is further configured to control the transceiver to transmit an uplink data in response to the trigger frame which is related to the Inter-BSS NAV or the Intra-BSS NAV that have been reset, when the transceiver receives a trigger frame from an Access Point (AP) of an Intra-BSS.

Advantageous Effects

As described above, while the hybrid NAV is operated through the method and apparatus, it is possible to prevent confusion due to a frame reception that cannot be distinguished from Inter-BSS frame or Intra-BSS frame.

The effects of the present invention are not limited to the above-mentioned effects, and other advantages of the present invention will be more clearly understood by those skilled in the art from the following description.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

Figure 1:
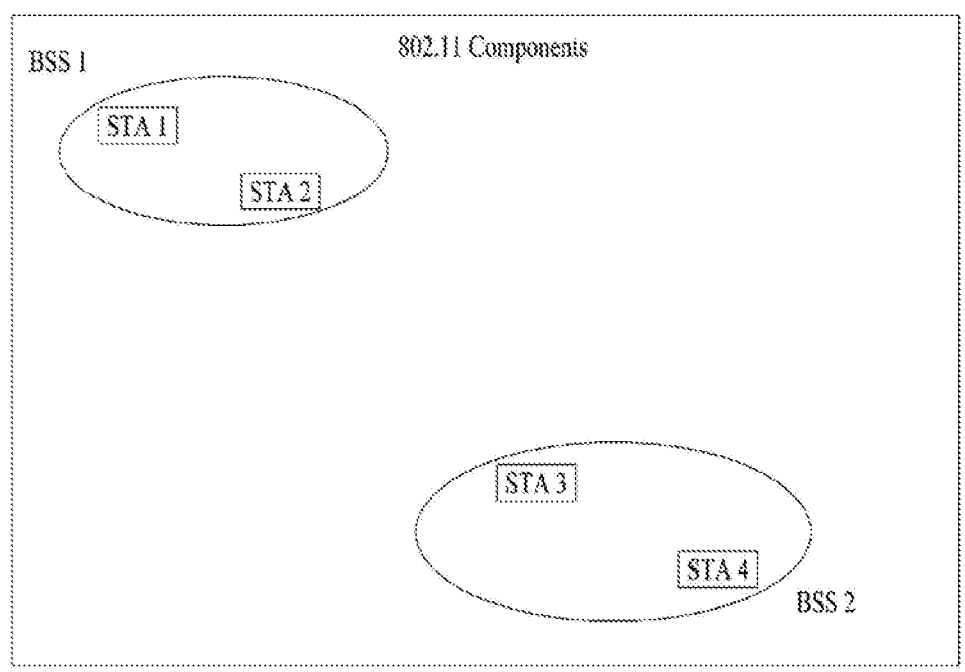
FIG. 1 illustrates an example of a configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a Physical layer of the wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
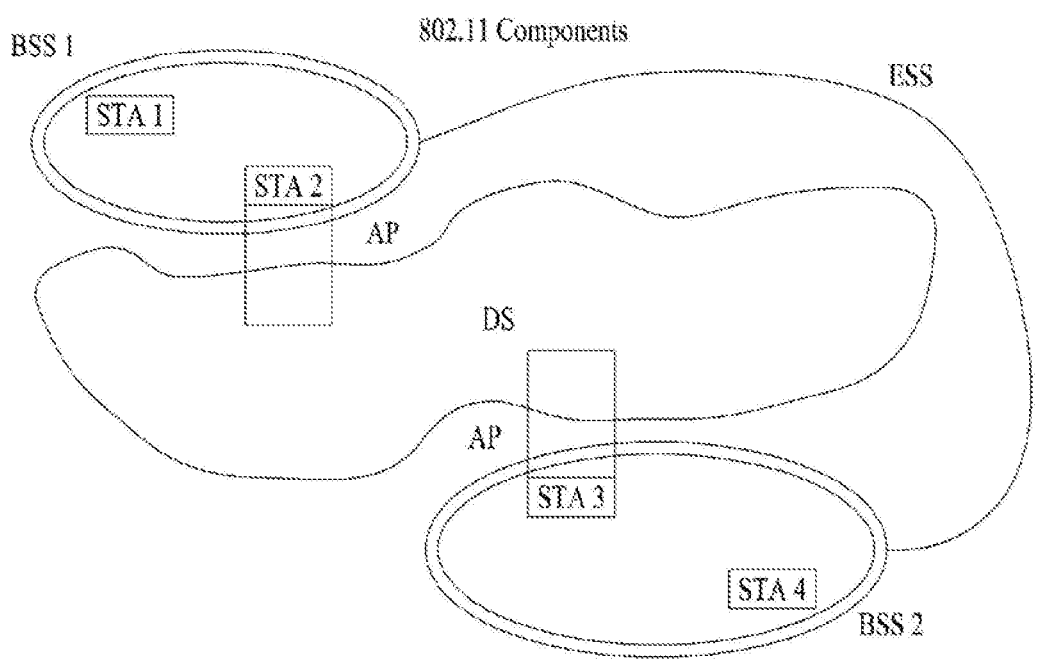
FIG. 2 illustrates another example of a configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically performed via an AP. However, if a sidelink is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
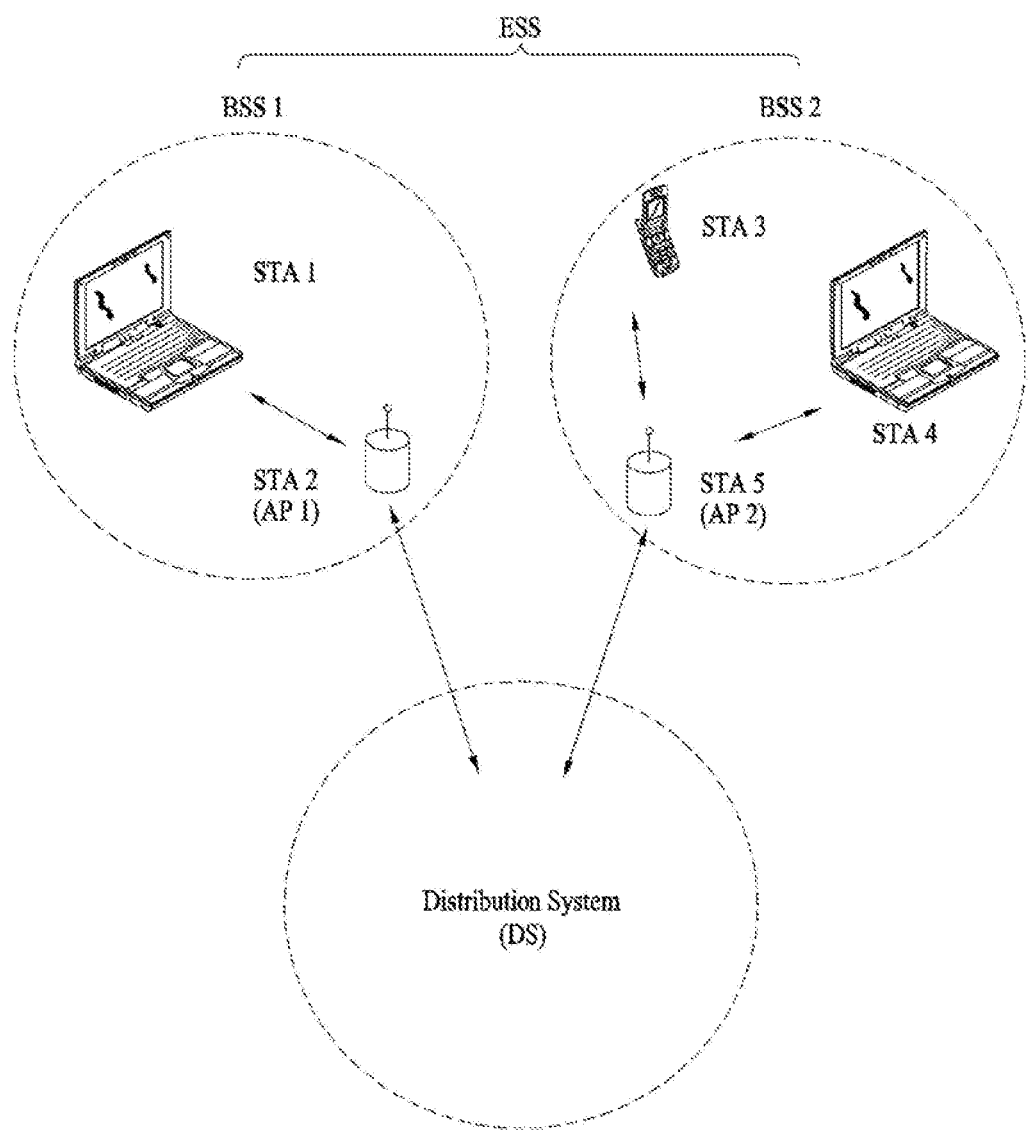
FIG. 3 illustrates an exemplary configuration of a WLAN system

FIG. 3 illustrates an exemplary configuration of a WLAN system. In FIG. 3, an exemplary infrastructure BSS including a DS is illustrated.

In the example of FIG. 3, an ESS includes BSS1 and BSS2. In the WLAN system, an STA is a device complying with Medium Access Control/Physical (MAC/PHY) regulations of Institute of Electrical and Electronics Engineers (IEEE) 802.11. STAs are categorized into AP STAs and non-AP STAs. The non-AP STAs are devices handled directly by users, such as laptop computers and mobile phones. In FIG. 3, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Figure 4:
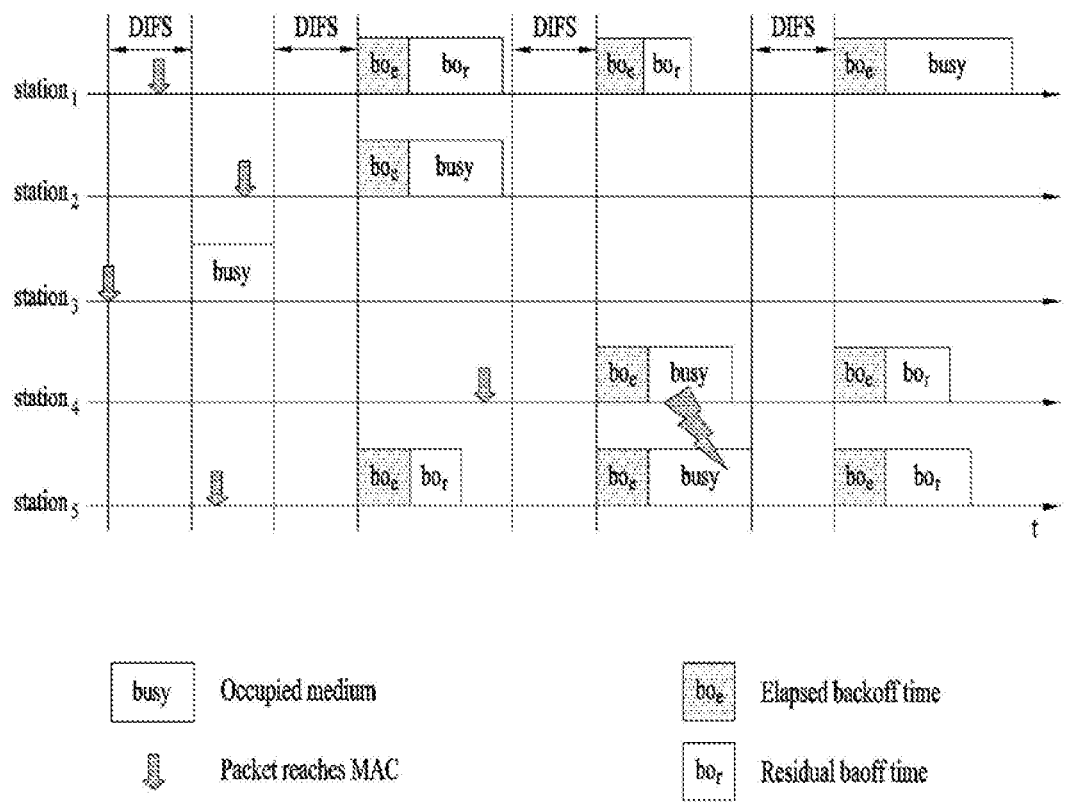
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to 2n−1 (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 5 and 6. Although an actual carrier sensing range is different from a transmission range, it is assumed that the actual carrier sensing range is identical to the transmission range for convenience of description and better understanding of the present invention.

Figure 5:
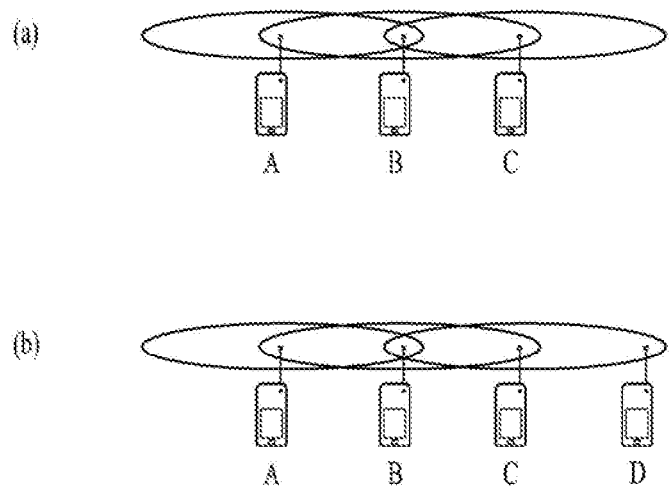
FIG. 5 is an explanatory diagram of a hidden node and an exposed node.

FIG. 5 is a conceptual diagram illustrating a hidden node and an exposed node.

FIG. 5(a) exemplarily shows the hidden node. In FIG. 5(a), STA A communicates with STA B, and STA C has information to be transmitted. In FIG. 5(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(b) exemplarily shows an exposed node. In FIG. 5(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
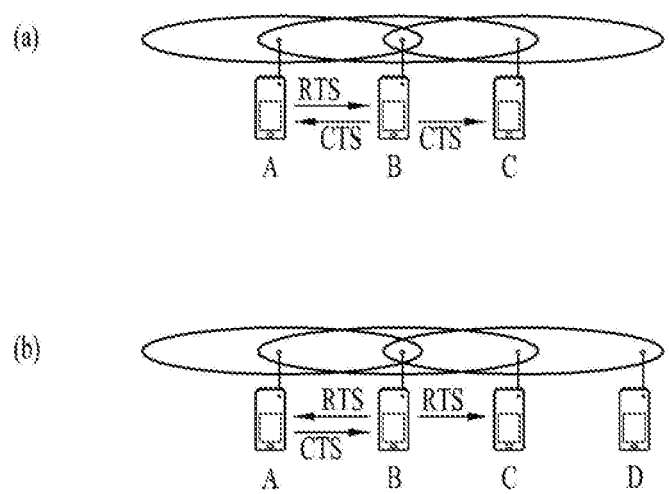
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(a) exemplarily shows the method for solving problems of the hidden node. In FIG. 6(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Hybrid NAV-Based Operation

HE STA can operate a hybrid NAV such as Intra-BSS NAV as a NAV for the BSS inside, and Inter-BSS NAV as a NAV for the BSS outside. The Inter-BSS NAV among these intra-BSS NAV and inter-BSS NAV may be referred to as a regular NAV. However, such a name may be changed (for example, a basic NAV).

When the STA operating the 2 NAVs receives the PSDU of the intra-BSS frame, the STA can update the intra-BSS NAV according to the duration field information of the received PSDU. In addition, when the STA receives the PSDU of the inter-BSS frame, the STA can update the regular NAV according to the duration field information of the received PSDU.

In the above example, the corresponding NAV is updated on the basis of the Duration field of the received PSDU. However, Intra-BSS NAV or Regular NAV may be equally updated through the TXOP Duration of the HE SIG-A of the received HE PPDU.

If the RA field of the received frame indicates the STA itself, the STA will not update the corresponding NAV. However, if the RA field of the received frame does not indicate the STA itself, the corresponding NAV can be updated based on information of the Duration field of the PSDU or the TXOP Duration field of the HE SIG-A, based on whether the received frame is an Inter-BSS frame or an Intra-BSS frame.

Thus, if two NAVs are supported by a particular STA, one or more of these NAVs are considered and one or more NAV counters are not zero, the virtual CS may determine that the medium is Busy.

Truncation of TXOP

In one aspect of the present invention, it is intended to solve the confusion in the TXOP truncation problem in the STA using two NAVs as described above. The concept of TXOP Truncation is explained here.

Figure 7:
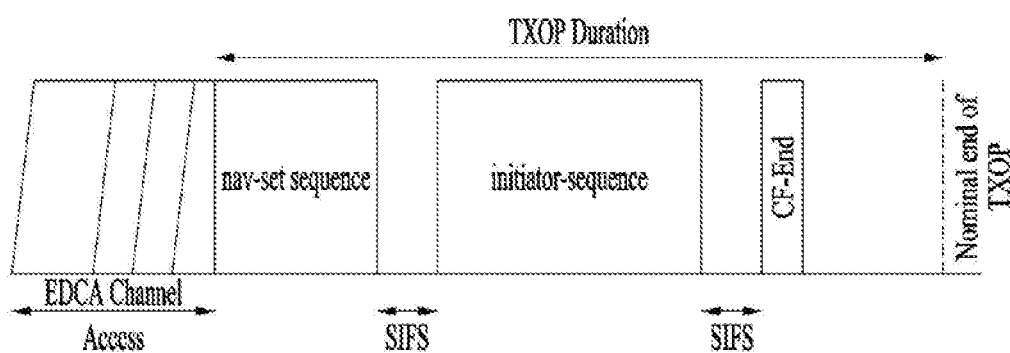
FIG. 7 is an explanatory diagram of a TXOP Truncation.

FIG. 7 is an explanatory diagram of a TXOP Truncation in an aspect of the present invention.

If the STA acquires the access right (TXOP) for the channel using the EDCA and there are enough remaining segments to transmit all of its data, the corresponding STA can transmit the CF-END frame.

Accordingly, the receiving STA that has received the CF-END frame resets the NAV, and specifically, can set the NAV timer to 0 at the end of this frame.

FIG. 7 shows an example in which TXOP truncation is performed based on this principle. First, the STA is connected to the channel using the EDCA channel connection and then the STA can transmit a nay-set sequence (e.g., RTS/CTS). Thereafter, after SIFS, the STA may send an initiator-sequence that may include multiple PPDU exchanges.

If STA doesn't have more data to transmit, the STA as a TXOP holder, can perform a TXOP Truncation by transmitting a CF-END frame, and the receiving side can also reset the NAV.

As described above, in the case of an STA that operates two NAVs, it is assumed in the embodiment of the present invention that two NAVs are independently operated to perform a TXOP Truncation as follows.

First, when the STA receives the CF-END frame in the inter-BSS, the STA can perform the TXOP Truncation by resetting the regular NAV. Also, when the STA receives the CG-END frame of the Intra-BSS, the intra-BSS NAV can be reset, and the TXOP Truncation can be performed.

Problems with a Frame that Cannot Distinguish a BSS

Hereinafter, the problem of TXOP Truncation will be described in detail when a STA using two NAVs receives frame that cannot distinguish BSS.

In general, the STA can identify the frame is an Inter-BSS frame or an Intra-BSS frame with the BSSID of the address information (RA or TA information) included in the BSS Color of the HE-SIG A in the HE PPDU or MAC header.

However, when the STA receives a frame (for example, ACK or CTS) that cannot distinguish the BSS, it could be a problem how to handle it.

According to an embodiment of the present invention, when the STA receives a frame that cannot distinguish between an Inter-BSS frame and an Intra-BSS frame, it is assumed that the frame is set to update the regular NAV if the frame wasn't transmitted to the STA.

However, when it is simply updating the Regular NAV in this way, the following problems may occur.

Figure 8:
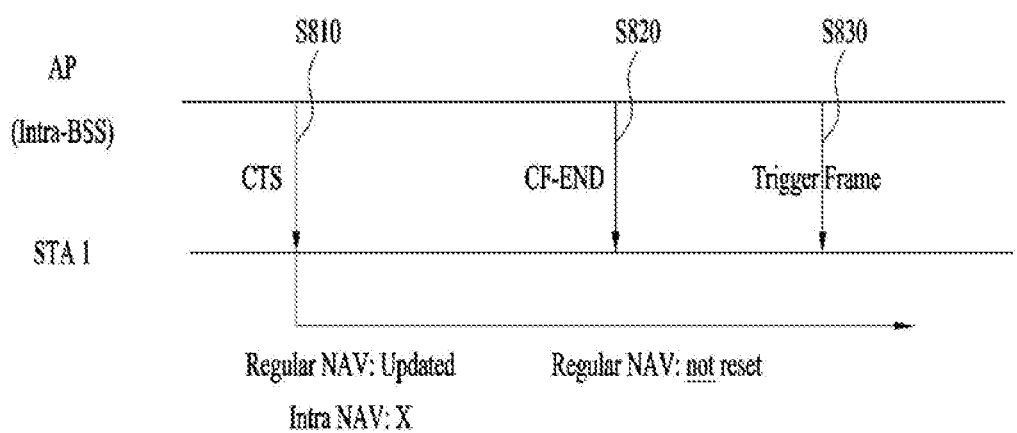
FIG. 8 is an explanatory diagram of a TXOP Truncation to be solved in one aspect of the present invention.

FIG. 8 is a diagram for explaining a problem in TXOP Truncation to be solved in one aspect of the present invention.

In the example of FIG. 8, it is assumed that the intra-BSS AP transmits a CTS frame to the STA (S810). Since the CTS frame cannot be distinguished between the inter-BSS frame and the Intra-BSS frame by the receiving STA, the STA updates only the regular NAV and does not update the intra-BSS NAV according to the above assumption.

Thereafter, if the CF-End frame is received in the Intra-BSS (S820), the Regular NAV is not truncated.

Accordingly, even when a Trigger Frame for the data transmission is received from the AP of the Intra-BSS (S830), the STA cannot transmit the UL MU frame.

Figure 9:
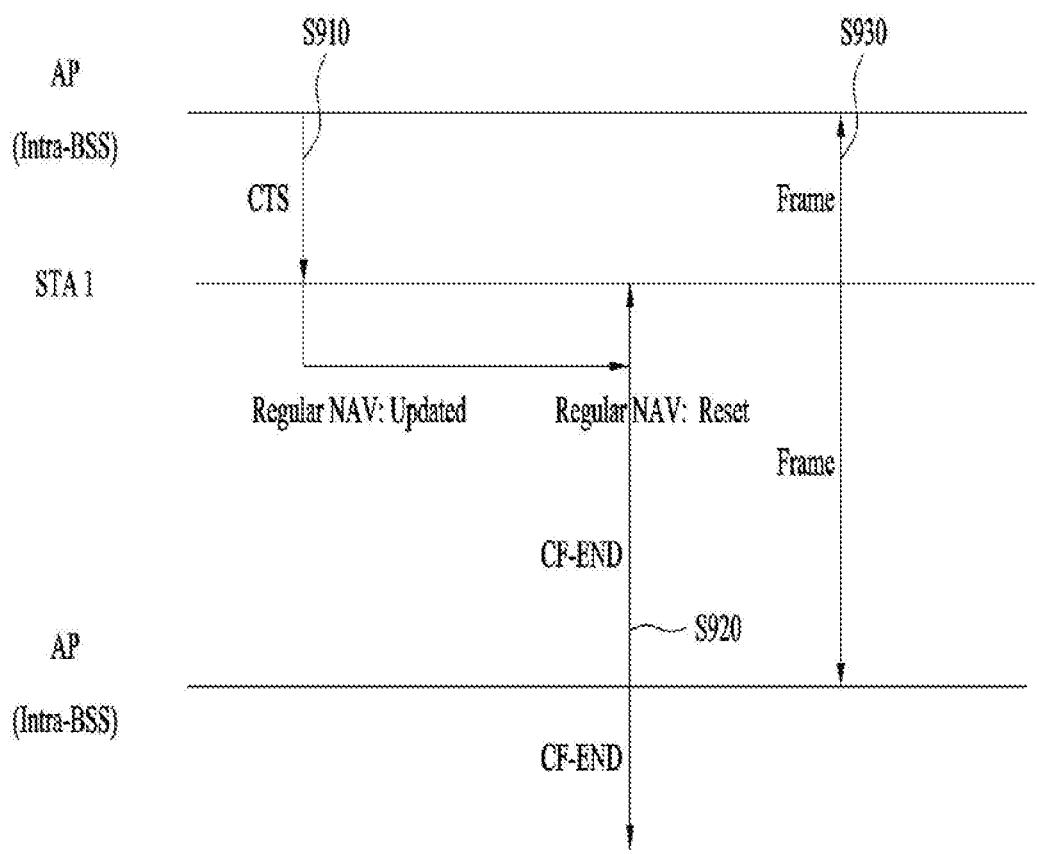
FIG. 9 is a diagram for explaining another problem in TXOP Truncation to be solved in one aspect of the present invention.

FIG. 9 is a diagram for explaining another problem in TXOP Truncation to be solved in one aspect of the present invention.

In FIG. 9, it is assumed that the intra-BSS AP transmits a CTS frame to the STA (S910). Since the CTS frame cannot be distinguished from the inter-BSS frame or the Intra-BSS frame by the receiving STA, the STA updates only the regular NAV and does not update the intra-BSS NAV according to the above assumption.

Then, it is assumed that a CF-END frame is received from the AP of the Inter-BSS in FIG. 9 (S920). In this case, since the NAV which is set by the CTS frame transmitted from the Intra-BSS AP, is a Regular NAV, the Regular NAV is reset because the corresponding CF-END frame is received, and then the STA can transmit the frame (S930). In this case, if the Hidden STA of the Intra BSS is transmitting to the AP, there may be a problem in the reception of the AP.

To solve such the above problems, various embodiments are presented.

Embodiment 1—Case 1, if it is Difficult to Identify the Inter/Intra BSS and the Condition Updating the Regular NAV is Maintained In this embodiment, the above-described problem is solved under the assumption that the condition that the regular NAV is updated by the received frame that cannot be distinguished from Intra-BSS or Inter-BSS is maintained.

Figure 10:
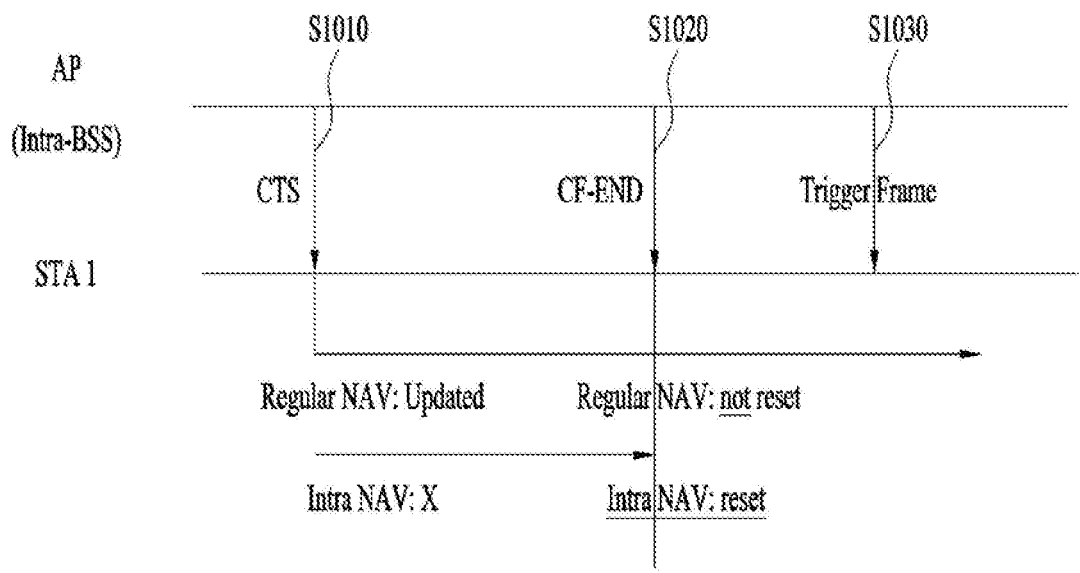
FIG. 10 and FIG. 11 are diagrams illustrating an example of defining a TXOP Truncation scheme according to the first embodiment of the present invention.
Figure 11:
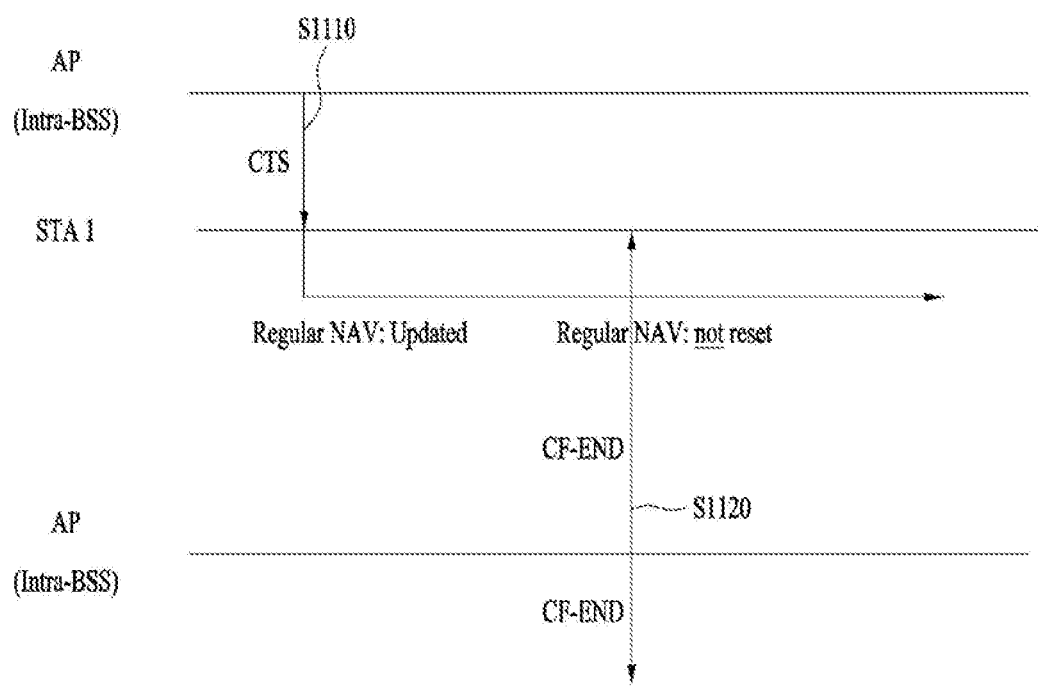

FIG. 10 and FIG. 11 are diagrams illustrating an example of defining a TXOP Truncation scheme according to the first embodiment of the present invention.

In FIG. 10, when the regular NAV is updated by the received frame that cannot be distinguished from the Intra-BSS or Inter-BSS (S1010), and the CF-End frame is received from the Intra-BSS STA (S1020), it is proposed to reset only the Intra-BSS NAV without resetting (/truncation) the Regular NAV. Because the Intra-BSS NAV is reset as described above, after that, when a trigger frame is received from the AP of the Intra-BSS (S1030), the UL MU frame can be transmitted (The problem of FIG. 8 is solved).

FIG. 11, when the regular NAV is updated by the received frame that cannot be distinguished from the Intra-BSS or Inter-BSS (S1110), and the CF-End frame is received from the Inter-BSS STA (S1120), it is suggested that the regular NAV is not reset (/truncated). Accordingly, even if the UL MU resource is allocated by the trigger frame of the Intra-BSS AP as shown in FIG. 11, it doesn't get a response of transmitting the UL MU frame. (The problem of FIG. 9 is solved).

Embodiment 2—Case 2, if it is Difficult to Identify the Inter/Intra BSS and the Condition Updating the Regular NAV is Maintained In this embodiment, the above-described problem is solved under the assumption that the condition that the regular NAV is updated by the received frame that cannot be distinguished from Intra-BSS or Inter-BSS is maintained.

In this embodiment, when the regular NAV is updated by the received frame that is indistinguishable between the Intra-BSS and Inter-BSS, the following performance is proposed. That is, if the CF-End frame is received from the Inter-BSS STA, the regular NAV is reset (truncated), and if the CF-End frame is received from the Intra-BSS STA, the Intra-BSS NAV and the regular NAV is reset (/truncate)

Also, if the regular NAV is updated by the received frame that is indistinguishable between the Intra-BSS and Inter-BSS, the UL MU resource is allocated by the trigger frame of the intra-BSS AP, the Intra-BSS NAV and the Regular NAV is not considered. That is, since the two NAVs are not considered, if the physical carrier sensing is idle, the UL MU frame can be transmitted to the allocated area.

Embodiment 3—Case 3, if it is Difficult to Identify the Inter/Intra BSS and the Condition Updating the Regular NAV is Maintained In the present embodiment, when the following conditions are satisfied, it is set that NAV is not reset in response to the CF-END frame reception.

(1) If the received CF-END frame is the inter-BSS frame and the latest NAV update is performed by the intra-BSS frame, and (2) The received CF-END frame is the intra-BSS frame, and the latest NAV update is performed by the inter-BSS frame.

It is also proposed to set the NAV of the STA to be reset in the cases other than the cases (1) and (2) above.

That is, in this embodiment, when the frame that cannot be distinguished from the Inter-BSS frame or the Intra-BSS frame is received as described above, the Regular NAV is updated. After that, if the CF-END frame is received, it is regarded as the corresponding NAV reset, and the NAV timer can be set to 0 at the end of the PPDU including the frame. That is, if it is not a condition that the NAV reset is not performed as in the above (1)-(2), the NAV may reset, regardless of whether the CF-END frame is the Inter-BSS frame or Intra-BSS frame.

At this time, it can be decided whether the Intra-BSS NAV is updated or the regular NAV is updated in accordance whether the CF-END frame is the Inter-BSS frame or Intra-BSS frame In addition, in an embodiment of the present invention, the regular NAV can be reset regardless of whether the CF-END frame is an Inter-BSS frame or an Intra-BSS frame.

According to the embodiment, when the CF-END frame is received from the AP of the Intra-BSS in step S820 in the case shown in FIG. 8, since the conditions of (1) and (2) are not satisfied, the STA reset the NAV, and then the problem described in FIG. 8 can be solved.

Embodiment 4—Case 1, if it is Difficult to Identify the Inter/Intra BSS and the Condition Updating the Regular NAV is Changed In this embodiment, when an STA supporting Two NAVs receives a frame (e.g., CTS or ACK) that cannot be distinguished from Intra-BSS or Inter-BSS, instead of updating the Regular NAV for NAV concerning the Inter-BSS, it is proposed to update the Intra-BSS NAV. In this case, Intra-BSS NAV can be called Regular NAV.

That is, the STA updates the Intra-BSS NAV by the frame (e.g., CTS or ACK) that cannot be distinguished from Intra-BSS or Inter-BSS.

If the frame is transmitted by the Intra-BSS STA and the Inter-BSS CF-End frame is received, since the Intra-BSS NAV is not reset, the problem situation shown in FIG. 8 does not occur (Case 1).

If the frame is transmitted by the Intra-BSS STA and the STA is allocated the UL resource by the transmission of the trigger frame of the Intra-BSS AP, since the Intra-BSS NAV is set, the problem situation mentioned in FIG. 9 does not occur (Case 2).

If the frame is transmitted by the Intra-BSS STA and the Intra-BSS CF-End frame is received, the STA immediately resets the Intra-BSS NAV (Case 3).

If the frame is transmitted by the Inter-BSS STA and the Inter-BSS CF-End frame is received, since the Intra-BSS NAV is not reset, the STA can occur the over-protection by maintaining the Intra-BSS NAV (Case 4).

If the frame is transmitted by the inter-BSS STA and the STA is allocated the UL resource by the transmission of the trigger frame of the intra-BSS AP, the STA can transmit the UL frame because the intra-BSS NAV is established. In this case, it may affect the transmission of the Inter-BSS STA (Case 5).

If the frame is transmitted by the Inter-BSS STA and the Intra-BSS CF-End frame is received, since the STA may reset the Intra-BSS NAV and it may affect the transmission of the Inter-BSS STA (Case 6).

The influence to the transmission of the inter-BSS STA of the case 5 and the case 6 was also a problem in the conventional method (operation with one NAV) and it is not a problem because the influence can be prevented by the position of the receiver. However, when the existing method is used, it is important to be always able to influence to it's BSS or not to transmit the UL MU frame.

Embodiment 5—Case 2, if it is Difficult to Identify the Inter/Intra BSS and the Condition Updating the Regular NAV is Changed In this embodiment, when a frame that cannot be distinguished from Intra-BSS or Inter-BSS is received, it is proposed to additionally maintain NAV for the frame. That is, the STA maintains three NAVs.

NAV1 maintains and manages the Intra-BSS NAV, NAV2 maintains and manages the Inter-BSS NAV, and the NAV3 maintains and manages other NAV. Other NAV (NAV3) is updated when it receives a frame that are indistinguishable from Inter-BSS or Intra-BSS. If the NAV3 is not 0, it cannot transmit a frame. The NAV3 is not truncated by the CF-END.

Figure 12:
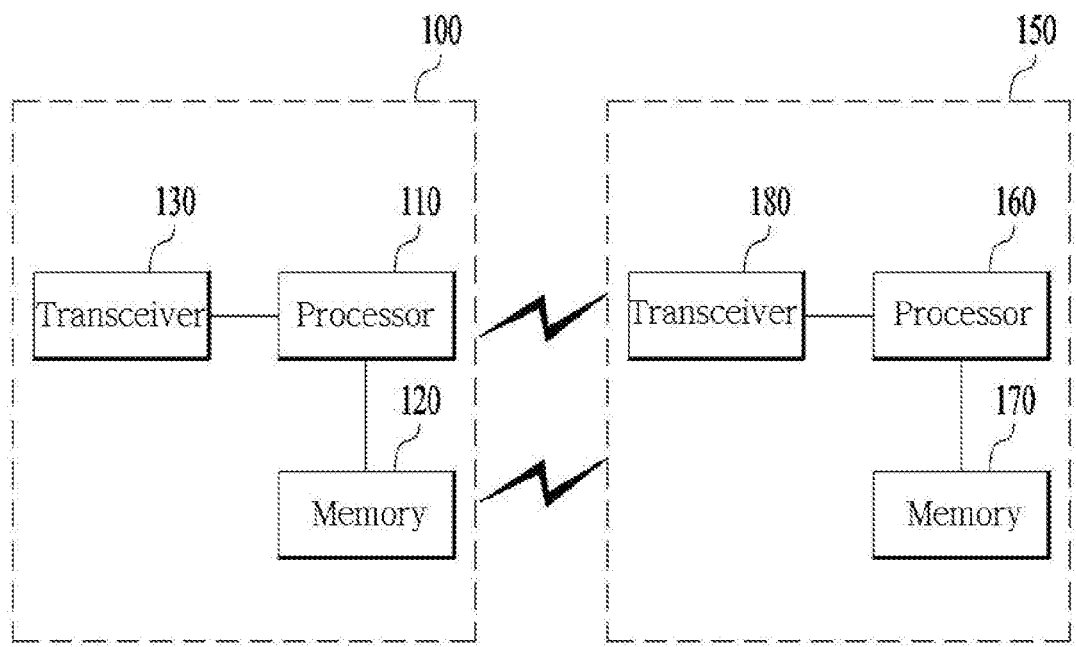
FIG. 12 is a block diagram showing an exemplary configuration of an AP apparatus (or base station apparatus) and a station apparatus (or terminal apparatus) according to an embodiment of the present invention.

FIG. 12 is a block diagram showing an exemplary configuration of an AP apparatus (or base station apparatus) and a station apparatus (or terminal apparatus) according to an embodiment of the present invention.

The AP 100 may include a processor 110, a memory 120, and a transceiver 130. The station 150 may include a processor 160, a memory 170, and a transceiver 180.

The transceivers 130 and 180 may transmit/receive a wireless signal and may implement, for example, a physical layer according to the IEEE 802 system. Processors 110 and 160 may be coupled to transceivers 130 and 180 to implement a physical layer and/or a MAC layer according to the IEEE 802 system. Processors 110 and 160 may be configured to perform an operation in accordance with one or more combinations of the various embodiments of the invention described above.

In addition, a module implementing the operations of the AP and the station according to various embodiments of the present invention described above may be stored in the memories 120 and 170 and executed by the processors 110 and 160. The memories 120 and 170 may be included in the internal of the processors 110 and 160 or may be installed in the external of the processors 110 and 160 and connected by the processors 110 and 160 and known means.

The description of the above-described AP apparatus 100 and station apparatus 150 can be applied to the base station apparatuses and terminal apparatuses in other wireless communication systems (for example, LTE/LTE-A system), respectively The specific configurations of the AP and the station apparatus may be implemented such that the elements described in the various embodiments of the present invention described above may be applied independently or two or more embodiments may be applied at the same time. For the sake of clarity, the redundant description is omitted.

Figure 13:
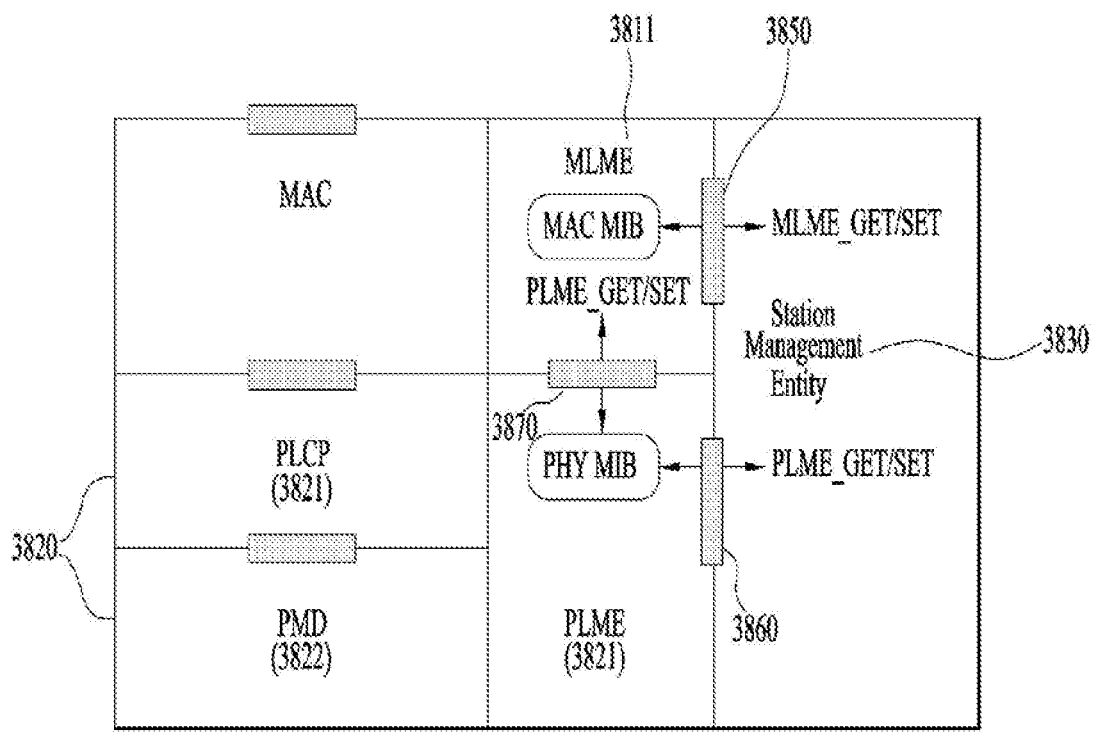
FIG. 13 shows an exemplary structure of a processor of an AP apparatus or a station apparatus according to an embodiment of the present invention.

FIG. 13 shows an exemplary structure of a processor of an AP apparatus or a station apparatus according to an embodiment of the present invention.

The AP or the processor of the station may have a plurality of layers and FIG. 13 shows a detailed structure in which a MAC sublayer 3810 and a physical layer 3820 on a DLL (Data Link Layer). As shown in FIG. 13, the PHY 3820 may include a Physical Layer Convergence Procedure (PLCP) entity 3821 and a PMD (Physical Medium Dependent) entity 3822. Both the MAC sublayer 3810 and the PHY 3820 conceptually include management entities called MLME (MAC sublayer Management Entity) 3811, respectively. These entities 3811 and 3821 provide a hierarchical management service interface in which hierarchical management functions operate.

To provide correct MAC operation, a Station Management Entity (SME) 3830 exists within each station. SME 3830 is a layer-independent entity that may be present in a separate management plane or may seem to be off-the-side. Although precise functions of SME 3830 are not specifically described in this document, generally, such an entity 3830 may appear to be responsible for collecting layer-dependent states from various Layer Management Entities (LMEs), similarly setting the values of layer-specific parameters, and so on. The SME 3830 typically performs these functions on behalf of the generic system management entity and can implement standard management protocols.

The entities shown in FIG. 13 interact in various ways. FIG. 13 shows some examples of exchanging GET/SET primitives. The XX-GET.request primitive is used to request the value of a given MIB attribute. The XX-GET.confirm primitive returns the appropriate MIB attribute information value if the Status is "Success", otherwise it is used to return an error instruction in the Status field. The XX-SET.request primitive is used to request that the indicated MIB attribute is set to the given value. When the MIB attribute indicates a specific operation, it is requested that the corresponding operation is performed. The XX-SET.confirm primitive confirms that the indicated MIB attribute is set to the requested value if the status is "successful", otherwise it is used to return an error condition to the status field. If the MIB attribute indicates a specific action, this confirms that the action has been performed.

As shown in FIG. 13, MLME 3811 and SME 3830 may exchange various MLME_GET/SET primitives through MLME_SAP 3850. Also, the various PLCM_GET/SET primitives can be exchanged between the PLME 3821 and the SME 3830 via the PLME_SAP 3860 and the MLME 3811 and the PLME 3870 via the MLME-PLME_SAP 3870.

The above-described embodiments of the present invention can be implemented by various means. For example, embodiments of the present invention may be implemented by a hardware, firmware, software, or a combination thereof.

In the case of hardware implementation, the method according to embodiments of the present invention may be implemented in one or more Application Specific Integrated Circuits (ASICs), Digital Signal Processors (DSPs), Digital Signal Processing Devices (DSPDs), Programmable Logic Devices (PLDs), FPGAs (Field Programmable Gate Arrays), processors, controllers, microcontrollers, microprocessors, and the like.

In the case of an implementation by a firmware or software, the method according to embodiments of the present invention may be implemented in the form of a module, a procedure or a function for performing the functions or operations described above. The software code may be stored in a memory unit and driven by the processor. The memory unit may be located inside or outside the processor, and may exchange data with the processor by various well-known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

As described above, the embodiments of the present invention can be applied to various wireless communication systems including an IEEE 802.11 system.

The invention claimed is:

1. A method for transmitting a signal by a first station (STA) in a Wireless Local Area Network (WLAN) system, the method comprising:
receiving a first frame;
updating an Intra-Basic Service Set (BSS) Network Allocation Vector (NAV) based on the first frame being an Intra-BSS frame;
updating an Inter-BSS NAV based on the first frame being an Inter-BSS frame or the first frame being indistinguishable between the Inter-BSS frame and the Intra-BSS frame; and
receiving a Contention Free (CF)-END frame,
resetting both of the Inter-BSS NAV and the Intra-BSS NAV based on that the CF-END frame is the Intra-BSS frame and the inter-BSS NAV was updated due to the first frame being indistinguishable between the Inter-BSS frame and the Intra-BSS frame; and
transmitting the signal based on the Inter-BSS NAV or the Intra-BSS NAV that have been reset.

2. The method of claim 1, further comprising resetting the Inter-BSS NAV based on that the CF-END frame is the Inter-BSS frame.

3. The method of claim 1, further comprising setting the Inter-BSS NAV timer or the Intra-BSS NAV timer to zero at the end of a Physical Protocol Data Unit (PPDU) including the CF-END frame, to reset the Inter-BSS NAV or the Intra-BSS NAV.

4. The method of claim 1, wherein the first frame which is indistinguishable between the Inter-BSS frame and the Intra-BSS frame, is an ACK frame or a Clear-To-Send (CTS) frame.

5. The method of claim 1, wherein transmitting the signal in accordance with the Inter-BSS NAV or the Intra-BSS NAV that has been reset, further comprises receiving a trigger frame from an access point (AP) of an Intra-BSS and transmitting an uplink data based on the trigger frame.

6. A first station (STA) operating in a WLAN(wireless LAN) system, the first STA comprising:
a transceiver configured to receive a first frame and a Contention Free (CF)-End frame; and
a processor for updating an Inter-BSS Network Allocation Vector (NAV) or an Intra-BSS NAV based on whether the first frame is an Inter-BSS (Basic Service Set) frame or an Intra-BSS frame,
wherein the processor is configured to update the inter-BSS NAV when the first frame is indistinguishable between the Inter-BSS frame and the Intra-BSS frame; and
wherein the processor is configured to reset both of the Inter-BSS NAV and the Intra-BSS NAV based on that the CF-END frame is the Intra-BSS frame and the inter-BSS NAV was updated due to the first frame being indistinguishable between the Inter-BSS frame and the Intra-BSS frame.

7. The first station (STA) of claim 6, wherein the processor is further configured to reset the Inter-BSS NAV based on that the CF-END frame is the Inter-BSS frame.

8. The first station (STA) of claim 6, wherein the processor is further configured to set an Inter-BSS NAV timer or an Intra-BSS NAV timer to zero at the end of a Physical Protocol Data Unit (PPDU) including the CF-END frame, to reset the Inter-BSS NAV or the Intra-BSS NAV.

9. The first station (STA) of claim 6, wherein the first frame that is indistinguishable between the Inter-BSS frame and the Intra-BSS frame, is an ACK frame or a Clear-To-Send(CTS) frame.

10. The first station (STA) of claim 6, wherein the processor is further configured to control the transceiver to transmit an uplink data in response to a trigger frame which is related to the Inter-BSS NAV or the Intra-BSS NAV that have been reset, when the transceiver receives the trigger frame from an Access Point (AP) of an Intra-BSS.

* * * * *